United States Patent [19]

Mueller et al.

[11] Patent Number: 5,461,028

[45] Date of Patent: Oct. 24, 1995

[54] FLUID-DRILL-HOLE TREATMENT AGENTS BASED ON CARBONIC ACID DIESTERS

[75] Inventors: Heinz Mueller, Monheim; Claus-Peter Herold, Mettmann; Alfred Westfechtel, Hilden; Stephan von Tapavicza, Erkrath, all of Germany

[73] Assignee: Henkel Kommanditgesellschaft auf Aktien, Duesseldorf, Germany

[21] Appl. No.: 955,738

[22] PCT Filed: May 29, 1991

[86] PCT No.: PCT/EP91/01001

§ 371 Date: Dec. 7, 1992

§ 102(e) Date: Dec. 7, 1992

[87] PCT Pub. No.: WO91/18958

PCT Pub. Date: Dec. 12, 1991

[30] Foreign Application Priority Data

Jun. 7, 1990 [DE] Germany .................... 40 18 228.2

[51] Int. Cl.⁶ .................... C09K 7/06; C09K 7/02
[52] U.S. Cl. .................... 507/138; 507/103; 507/136
[58] Field of Search .................... 507/138, 103, 507/136

[56] References Cited

U.S. PATENT DOCUMENTS

| | | | |
|---|---|---|---|
| 3,642,858 | 2/1972 | Frevel et al. | 260/463 |
| 4,374,737 | 2/1983 | Larson et al. | 252/8.5 P |
| 4,481,121 | 11/1984 | Barthel | 252/8.5 M |
| 4,504,418 | 3/1985 | Langdon | 260/463 |

FOREIGN PATENT DOCUMENTS

| | | |
|---|---|---|
| 0374671 | 6/1990 | European Pat. Off. . |
| 0374672 | 6/1990 | European Pat. Off. . |
| 0386638 | 9/1990 | European Pat. Off. . |
| 0386636 | 9/1990 | European Pat. Off. . |
| 0391252 | 10/1990 | European Pat. Off. . |
| 0398113 | 11/1990 | European Pat. Off. . |
| 1242569 | 6/1967 | Germany . |
| 898077 | 12/1971 | Italy . |
| 1574188 | 9/1980 | United Kingdom . |

*Primary Examiner*—Philip Tucker
*Attorney, Agent, or Firm*—Ernest G. Szoke; Wayne C. Jaeschke; Real J. Grandmaison

[57] ABSTRACT

Described is the use of oleophilic monomeric and/or oligomeric diesters of carbonic acid with the same or different oil-soluble and ecologically compatible mono-functional and optionally polyfunctional alcohols as a component of oil-based or water-based drilling fluids and other fluid drill-hole treatment agents. The invention in one embodiment comprises oil-based fluids, and particularly inverted fluids of the W/O type, which in the continuous phase at least in part contain oleophilic carbonic acid diesters. In a further important embodiment the invention relates to water-based emulsion fluids which in the dispersed oil phase at least in part contain said oleophilic carbonic acid diesters. The invention further comprises drill-hole treatment agents, and especially drilling fluids of the above-mentioned types, the continuous or dispersed oil phases of which, respectively, consist of oleophilic carbonic acid disasters or contain said ester type in admixture with other ecologically compatible oil mixing components. Preferred mixing components for a use in combination which the carbonic acid diesters are appropriate carboxylic acid ester oils, oleophilic alcohols and/or oleophilic ethers.

17 Claims, No Drawings

FLUID-DRILL-HOLE TREATMENT AGENTS BASED ON CARBONIC ACID DIESTERS

This application is A 371 of PCT/EP91/01001 filed May 29, 1991.

BACKGROUND OF THE INVENTION

Field of the Invention

The invention relates to novel drill-hole treatment agents which are fluid under normal conditions and have been composed by using an oil phase in combination. Referring to a characteristic example for treating agents of this kind, the invention is described hereinbelow by way of drilling fluids and drilling muds formed therewith. However, the field of application of the modification according to the invention of auxiliary liquids of the kind involved here is not limited thereto, while it also includes in particular the areas of spotting fluids, spacers, auxiliary liquids for workover stimulation and for fracturing.

Concerned by the invention are auxiliary liquids of the kind mentioned which are oil-based, i.e. which work using a continuous oil phase, as well as auxiliary agents wherein the oil phase has been emulsified in an especially aqueous continuous phase. Here, drilling fluids and drilling muds formed therewith are characteristic examples of the various possibilities.

There have been known, on the one hand, water-based drilling fluids having a content of from about 1 to 50% of emulsified oil phase—besides the other conventional auxiliary materials of such a drilling fluid—which are designated as emulsion fluids. On the other hand, there are being used to a wide extent in practice oil-based fluid systems wherein the oil constitutes the fluid phase or at least the predominant portion of the fluid phase. Here the so-called inverted drilling muds are of particular importance which, based on W/O emulsions, contain a dispersed aqueous phase in the continuous phase. The content of the dispersed aqueous phase usually is within the range of from about 5 to 50% by weight. The invention equally relates to both of the fields as mentioned here of the oil-based sweeping systems and of the water-based sweeping systems based on emulsions.

The use of the new fluid drilling-hole treatment agents is of particular importance for the exploitation of crude oil and natural gas, especially in the marine sector, while it is not limited thereto. The new systems may find general use in terrestrial drilling, for example in geothermal drilling, water drilling, in carrying out geo-scientific drilling and in drilling in the field of mining.

Prior Art

Liquid sweeping systems for rock-drilling to bring-up the removed drill cuttings have been known to restrictedly thickened fluid systems which may be assigned to one of the three following classes:

Merely aqueous drilling fluids, oil-based drilling fluid systems which, as a rule, are used as so-called inverted emulsion drilling muds, and the water-based O/W emulsions which contain a heterogeneous finely dispersed oil phase in a continuous aqueous phase.

Drilling fluids having a continuous oil base in general are composed as a three-phase system: Oil, water and finely divided solids. Therein the aqueous phase has been heterogeneously distributed in a finely dispersed state in the continuous oil phase. A multiplicity of additives is provided, more specifically emulsifiers, weighting agents, fluid-loss additives, alkali reserve, viscosity modifiers and the like. As to details, reference is made, for example, to the publications P. A. Boyd et al., "New Base Oil Used in Low-Toxicity Oil Muds", Journal of Petroleum Technology 1985, 137 to 152, and R. B. Bennett, "New Drilling Fluid Technology—Mineral Oil Mud" Journal of Petroleum Technology 1984, 975 to 981, as well as the literature quoted therein.

Drilling fluids comprised of water-based O/W emulsion systems with view to their utility properties occupy an intermediate position between the neat aqueous systems and the oil-based inverted fluids. Extensive substantial information is found in the pertinent technical literature; reference may be made, for example, to G. R. Gray and H. C. H. Darley, "Composition and Properties of Oil Well Drilling Fluids", 4th Edition, 1980/81, Gulf Publishing Co., Houston, and the voluminous substantial and patent literature quoted therein, and to the reference book "Applied Drilling Engineering", Adam T. Bourgoyne Jr. et al., First Printing Society of Petroleum Engineers, Richardson, Tex. (U.S.A.).

Today the oil phases of drilling fluids of the type described here and comparably composed other drill-hole treatment agents in practice are almost exclusively formed by mineral oil fractions. This involves a considerable environmental pollution, if, for example, the drilling muds directly or via the drilled rock will infiltrate the environment. Mineral oils are only difficult to decompose and are virtually not anerobically degradable at all and, thus, to be rated as long-term pollutants.

More recently there have been made some proposals to reduce the above problems. Thus, the U.S. Pat. Nos. 4,374, 737 and 4,481,121 describe oil-based inverted drilling fluids wherein so-called non-polluting oils are reported to have been used. As the non-polluting oils there have been mentioned side by side and equivalently mineral oil fractions which are free of aromatics and ester oil of vegetable and animal origin. Said ester oils are triglycerides of natural fatty acids which are known to have a high environmental compatibility and under ecological considerations are clearly superior to hydrocarbon fractions.

Applicant, in a greater number of older publications, describes proposals substituting the mineral oil fractions with ecologically compatible readily degradable oil phases. Thereby, three different types of substituting oils have been presented which may also be used as mixtures. They include selected oleophilic monocarboxylic acid esters, at least largely water-insoluble alcohols which are fluid under the operation conditions and corresponding ethers. In summary, reference is made here to the older applications U.S. Ser. No. 07/759,097; U.S. Ser. No. 07/825,431; U.S. Ser. No. 07/752,694; U.S. Ser. No. 07/752,692; U.S. Ser. No. 07/825,436; U.S. Ser. No. 07/478,189; U.S. Ser. No. 07/768,937; and U.S. Ser. No. 07/768,419. All of the older applications mentioned here relate to the field of oil-based drilling fluid systems, especially of the W/O inverted type. Water-based emulsion fluids using oil phases of an increased degradability have been described in the older applications U.S. Ser. No. 07/776,003; U.S. Ser. No 07/773,631; and U.S. Ser/ No. 07/777,376.

Problem of the invention and its technical solution

It is the object of the invention to employ a substance class in drilling-hole treatment agents of the type concerned here, as the oil phase, at least portionwise, the use of which substance class so far has not yet been previously described.

At the same time, within the intentions of said older applications, the invention aims to provide an oil phase which is distinguished by its excellent ecological compatibility which is accompanied by a good performance—which may even be improved over that of oil phases so far used—in the respective case of use in practice.

Other than in the operating examples, or where otherwise indicated, all numbers expressing quantities of ingredients or reaction conditions used herein are to be understood as modified in all instances by the term "about".

The inventive teaching is based on the recognition that selected diesters of-carbonic acid are excellent substituting oils within the scope of the invention. Said carbonic acid diesters may altogether form the respective oil phase in total, but they may be employed also in admixture with other oils, especially those from the class of the so-called non-polluting oils. Particularly suitable as mixing components are carboxylic acid ester oils, oleophilic alcohols and/or ethers from Applicant's previously mentioned older applications.

Thus, the invention, in a first embodiment, relates to the use of oleophilic diesters of carbonic acid with the same or different oil-soluble and ecologically compatible monofunctional and optionally polyfunctional alcohols as a constituent of oil- or water-based drilling fluids and other fluid drill-hole treatment agents.

A first embodiment of this presentation of the invention is characterized in that the oleophilic carbonic acid diesters are employed in the oil phase of oil-based fluids, especially of inverted fluids of the W/O type and therein are present either as an additive of lower concentration in the continuous oil phase, but preferably constitute the at least predominant portion of the oil phase.

In a second preferred embodiment the oleophilic carbonic acid diesters are used in water based emulsion fluids of the O/W type. Here also they are present in the dispersed phase at least in a lower concentration, while in a particularly preferred embodiment they comprise the at least predominant portion of said phase.

The invention, in a further embodiment, relates to drill-hole treatment agents which are fluid and pumpable within the temperature range of from 5° C. to 20° C., and more specifically to drilling fluids based on either a continuous oil phase, especially in admixture with a dispersed aqueous phase (W/O inverted type)

or a dispersed oil phase in a continuous aqueous phase (O/W emulsion type), said embodiment of the invention being characterized in that said drill-hole treatment agents in the oil phase thereof contain oleophilic carbonic acid diesters based on oil-soluble and ecologically compatible monofunctional alcohols and optionally water- and/or oil-soluble polyfunctional alcohols.

Further, it is applicable to the embodiments described here of the teaching according to the invention that the drill-hole treatment agents may contain the conventional dissolved and/or dispersed auxiliary materials such as viscosity modifiers, emulsifiers, fluid-loss additives, wetting agents, finely divided weighting agents, salts, alkali reserve and/or biocides. According to the invention there is applicable the further preferred measure that predominantly those inorganic and/or organic auxiliary and additive materials are included in the use which are ecologically and toxicologically at least largely acceptable.

DETAILED DESCRIPTION OF THE INVENTION AND PREFERRED EMBODIMENTS

Oleophilic oil-soluble carbonic acid diesters, the production thereof-and the use thereof in various fields have been-the subject matters of numerous printed publications. Thus, in the EP-A1-0 089 709 there have been described lubricant mixtures based on diesters of higher alcohols, with preferred molecular weights of the alcohols being within the range of from about 100 to 270. In said literature reference there have also been described possibilities of the preparation of the respective carbonic acid diesters referring to the pertinent literature (Italian Patent No. 898 077 and British Patent 1,574,188). The preparation of carbonic acid diesters of monofunctional alcohols starting from alkylene carbonates has been described, for example, in the U.S. Pat. No. 3,642,858. The alkylene carbonates employed as starting materials are the carbonic acid esters of lower diols having vicinal hydroxyl groups. The DE-AS 12 42 569 describes the use of neutral carbonic esters of monofunctional alcohols each having from 4 to 22 carbon atoms in the alcohol moiety as foam-suppressing agents. Re the preparation of these carbonic acid diesters there is referred to methods known in the literature such as those described, for example, in Houben-Weyl, Methoden der organischen Chemie, O. Thieme Verlag Stuttgart, Volume 8, page 106 (4th Edition 1952). However, on the other hand, it has also been known to modify carbonic acid esters by the incorporation of hydrophilic and hydrophobic groups in the molecule in such a manner that the resulting compounds may find use as biologically degradable non-ionic surfactant components; hereto cf., e.g., the U.S. Pat. No. 4,504,418.

What has never been described and has not been known is the use, or use in combination, of the carbonic acid-based esters selected according to the invention in the formation of the oil phase in drill-hole treating agents of the described types. As Applicant found, this class of substances is quite particularly suitable for this use. In view of this intended use, carbonic acid diesters exhibit a balance behavior of stability to hydrolysis and instability to hydrolysis. The compounds are sufficiently stable such as to be successfully usable under the marginal conditions of the working means involved here. When stored under environment conditions—and especially in the marine eco-system—diesters then will yet be subject to a biological degradation, the compatibility of the ester being determined by the alcohol employed here. Thus, according to the invention it is possible to achieve an optimum tuning of useful properties and bio-compatibility.

Within the scope definition according to the invention, the term carbonic acid diesters includes the corresponding compounds in the narrower sense of the word which comprise a carbonic acid residue to which two alcohol moieties have been linked through ester bonds. However, the scope of the definition according to the invention also includes those oligomeric compounds wherein a plurality of carbonic acid residues are bound in a molecule while each carbonic acid residue has been incorporated in the form of a diester. The respective oligomeric compounds are obtained, if polyfunctional alcohols are employed together with monofunctional alcohols and at least 2 hydroxyl groups of these polyhydric alcohols will interact with different carbonic acid molecules. Also essential for this embodiment is the simultaneous use of functional alcohols so that finally a diester bonding is ensured for each carbonic acid moiety. Oleophilic oligomeric carbonic acid diesters of the type last described, if intended to be used according to the invention, will contain not more than 10 carbonic acid moieties per molecule, the preferred upper limit being about 5 carbonic acid moieties per molecule on the average. Especially suitable oligomeric carbonic acid diesters within the scope of the invention contain 2 or 3 carbonic acid moieties per molecule on the average.

The term carbonic acid diesters, within the scope of the definition according to the invention, further includes certain selected symmetric diesters—for example as reaction products of carbonic acid and a definitely selected oil-soluble monofunctional alcohol—but also related asymmetric esters which contain different alcohols bonded to the carbonic acid moiety. Finally, comprised by this term are also any optional mixtures of symmetric and/or asymmetric—monomeric and/or oligomeric—carbonic acid diesters such as those obtained, for example, as a random mixture upon the reaction with a mixture of at least 2 monofunctional alcohols, and optionally with the simultaneous use of polyhydric alcohols.

For all of the compounds or mixtures of compounds of the definition given here there is likewise valid that they are oleophilic carbonic acid diesters which only have a low residual solubility in water. As a rule, the solubility of said diesters in a temperature range of from 0° C. to 20° C. at most is about 1% by weight; preferably the solubility will be lower, for example 0.5% by weight at most or even about 0.1% by weight at most. All of the carbonic acid diesters to be employed according to the invention are distinguished by similar flash point characteristics. The flash points of the oleophilic diesters used according to the invention should be at least 80° C., and preferably at least 100° C. For reasons of safety in the practice of plant operations it may be desirable to employ higher limiting values of the flash point for the oil phase, so that flash points of at least about 135° C. and especially of at least about 150° C., may be of particular practical importance.

A further element which is conformably relevant to the quality and composition of the carbonic acid diesters to be employed according to the invention is the requirement of ecological compatibility. This condition will be eventually satisfied by the alcohols used for esterification. Hereto, the following is applicable:

The term ecological compatibility, under one aspect, comprises the biological degradability in the respective eco-system concerned, that is in deep-sea drilling especially the marine eco-system. However, in addition, some farther-reaching consideration deserves attention, especially under the aspect of selecting suitable monofunctional alcohols. Here it is to be considered that in practical use of the oil phases according to the invention in admixture with aqueous phases, and particularly under the elevated temperatures occurring in the drill-hole, partial ester decomposition may occur with the formation of the respective portions of free alcohols. Then the free alcohol will be present in admixture with the remaining components of the oil phase. Here it may be important that the free alcohols will be selected so that any inhalation-toxicological danger to the crew at the drilling site will be definitely excluded. The problem addressed here particularly relates to monofunctional alcohols, as polyfunctional alcohols, even the lowest members thereof, exhibit such low volatility values that the safety as required for practical work will have been a priori constituted.

Monofunctional alcohols suitable for the formation of carbonic acid diesters, more specifically, are oil-soluble compounds of this kind comprising at least 5 carbon atoms, and preferably at least 6 carbon atoms. An upper limit of the number of carbon atoms is in practice derived only from deliberations on the accessability of the respective monoalcohols. For practical reasons the limit may be at about 40 carbon atoms. Monofunctional alcohols of the range $C_{8-36}$, and especially $C_{8-24}$, may be especially suitable. These alcohol components are preferably free from aromatic molecule constituents and, more particularly, will contain straight-chain and/or branched hydrocarbon chains of natural and/or synthetic origin. The respective alcohols and especially those alcohols comprising a higher number of carbon atoms, for example of $C_{16-24}$, in part may be olefinically mono- or as well poly-unsaturated. The incorporation of olefinic double bonds in a known manner affects the rheology of the corresponding diesters to increase the fluidity thereof also at lower temperatures. This property may be utilized according to the invention. However, associated therewith is some susceptibility to oxidation during practical operation, which as the case may be will require the simultaneous use of stabilizing antioxidants and, if appropriate, additional synergistically active auxiliary materials. The reduction of high rheology also into low temperature ranges is also promoted by the use of branched hydrocarbon chains. Here an optimum of ecological compatibility and rheological data of the oil phase for the specific intended use may be found by way of suitable adjustment. The rheology of the carbonic acid diesters may be additionally controlled by the additional use of alcohol mixtures. Thereby it is in fact well possible to exclusively employ carbonic acid diesters based on straight-chain fatty alcohols of natural origin of the range of $C_{6-18}$, and especially of the range of at least predominantly $C_{8-14}$, even if the carbonic acid diester-based material is to meet high requirements with respect to good rheology also at low temperatures.

Highly mobile acid diesters up to high numbers of carbon atoms of the indicated range may be obtained by at least the portionwise use of branched monofunctional alcohols, for example appropriate synthetic alcohols or from the oligomerization of straight-chain feedstock of natural origin.

The polyhydric alcohols as simultaneously used if desired also comprise a wide range of the numbers of carbon atoms in the molecule. Especially suitable are the polyhydric alcohols comprising from 2 to 40 carbon atoms. The polyhydric alcohols simultaneously used in the formation of the carbonic acid diesters may be water-soluble and/or oil-soluble. Also in the form of their lowest members, for example in the case of ethylene glycol, they do not possess high volatility. Generally they are acceptable under toxicological, and particularly under inhalation-toxical aspects. Preferred are polyfunctional alcohols having up to 5 hydroxyl groups, and preferably having 2 and/or 3 hydroxyl groups, as the ester-forming components of the oil phase based on carbonic acid diesters.

The polyfunctional alcohols may have been incorporated in different forms in the specific structure of the oil phase employed based on carbonic acid diesters according to the invention. More specifically, three types of structures are to be considered:

The polyfunctional alcohol may be present as a hydroxyl group-terminated ester moiety bonded to the carbonic acid. The polyfunctional alcohol may also be a chain-extending link forming ether groups between the carbonic acid moiety and the esterifying monofunctional alcohols. Eventually, the use of the polyhydric alcohol may result in the formation of the oligomeric carbonic acid diesters. This will be possible especially if the hydroxyl groups of the polyhydric alcohol are so much remote from each other that a formation of 5- or 6-membered rings will not be possible with only one carbonic acid moiety.

Particularly in the area of the oligomeric carbonic acid diesters it has been shown that good rheological properties are adjustable even with comparably high molecular weights. Thus, for example, a complex carbonic acid diester mixture which is liquid at room temperature is obtained if a diol obtained from dimer fatty acids and having a random average of 36 carbon atoms is reacted with 2 equivalents of isotridecyl alcohol as the monofunctional component and 2 equivalents of carbonic acid.

However, good rheological data, especially at low temperatures, are adjusted not only by means of complex alcohol and/or material mixtures; also the use of defined monofunctional alcohols may result in the formation of oleophilic carbonic acid diesters which will well meet the various requirements according to the invention. Here, as examples, the synthetic alcohols 2-ethylhexyl alcohol and isotridecyl alcohols may be mentioned. For example, di-2-ethylhexyl carbonate has a pour point of $-56.6°$ C. and a flash point of 154° C. Upon the use of this carbonic acid diester an inhalation-toxicological exposure is to be feared as little as from the comparable symmetric carbonic acid diesters with alcohols containing a higher number of carbon atoms, for example, the di-isotridecyl carbonate.

Especially for a use at comparably high working temperatures—for example a use in sufficiently deep drill-holes where the drill-hole temperatures will be at least 120° C. to 150° C., the use of the carbonic acid diesters as the oil phase may imply significant advantages. In general, compounds of this kind exhibit a high temperature-stability which has satisfactory values, for example, up to 300° C. Here, influence may be exerted on the temperature-stability by way of a selection of the suitable alcohol components.

Explicit reference may be made in the context of a simultaneous use of polyfunctional alcohols to the following particularity: As a result of the deliberate purposeful incorporation of, more specifically, lower di- and/or trihydric alcohols the HLB value of the oil phase may be controlled and, hence, the ability thereof of incorporating and stabilizing a dispersed aqueous phase, on the one hand, and of its dispersion to form a dispersed oil phase in continuous aqueous phase. By this route it becomes possible to control the use of the emulsifiers as used until today with respect to kind and/or amount thereof, and to reduce the amount thereof, so that, if desired, the concomitant use of emulsifiers may even become altogether dispensable. Here, the invention opens up important chances for a use of ecologically clearly improved working means.

The respective definite quality and composition of the carbonic acid diesters employed, and more specifically the rheology thereof, may be subject to variation within wide limits. This may be apparent from the following contemplation: If the carbonic acid diester is employed as the main component in oil-based systems, then as a rule the simultaneous ascertainment of good rheological properties is necessary also at low temperatures. In this case the pour point and setting point should be below 0° C. and preferably below $-5°$ C., while still lower values—e.g. those below $-10°$ C. or even below $-15°$ C.—may be especially advantageous. Here the Brookfield (RVT) viscosity at from 0° C. to 5° C. in preferred systems should not be higher than 55 mPa.s, and preferably not higher than 45 mPa.s.

If the carbonic acid diester is employed as the dispersed phase in water-based emulsion systems, then much lower demands may be imposed on the fluidity of the specific carbonic acid diester. Thus, the pour point and setting point may be above 0° C. Nevertheless it may be convenient, here to provide at least values in the range of about the room temperature. Here the Brookfield (RVT) viscosity at 20° C. may be within the range up to about 2 millions mPa.s or even higher, and preferably within the range up to about 1 million mPa.s.

That in just this embodiment comparably sparingly mobile carbonic acid diesters may be efficient auxiliary agents, will be apparent, for example, from the following consideration: The dispersed oil phase in water-based emulsion systems will have to fulfil a plurality of technical functions, one of which, among others, is that of a lubricant. Therein, already comparably low amounts of a respective dispersed oil phase—for example from about 1 to 8% by weight of a dispersed oil phase—are capable of substantially improving such water-based emulsion fluids. It is within the scope of the invention to employ the corresponding representatives based on the carbonic acid diesters—which inter alia have been known to be superior lubricants—in the form as here suggested.

The question of the viscosity inherent to the respective employed carbonic acid diester material also loses some of its importance, if these materials defined according to the invention are used in admixture with other oil phases. More particularly this will be valid, if the carbonic acid diesters will comprise minor amounts in the admixtures forming the oil phase and here will modify certain properties in a certain way, for example ensure a higher lubricating effect, without crucially affecting the rheology of the total system.

Possible components to be admixed to the oil phase

Oil components suitable for being admixed within the scope of the invention in the first place are the mineral oils as employed in the present-day practice of drilling fluids, and preferably aliphatic and/or cycloaliphatic hydrocarbon fractions which are substantially free from aromatics. Reference is made to the pertinent state of the art as represented by printed publications into the pertinent products as commercially available in the market.

However, within the scope of the invention particularly important components for mixing are environment-compatible oleophilic alcohols, corresponding ethers and/or ester oils such those in detail described in Applicant's older applications as initially mentioned. Hereby the subject matters of these older applications are incorporated by reference in the disclosure of the present description of the invention, while some essential aspects of said older technical teachings may be featured hereinbelow.

The oleophilic mixing components based on alcohols, ethers and/or carboxylic acid esters may comprise the predominant portion of the of the oil phase. Then, carbonic acid diesters within the meaning according to the invention are concomitantly used for adjusting certain material properties. Nevertheless, as a rule, here the amount of the carbonic acid diester will be some percent by weight of the oil phase, for example about 5% by weight of the oil phase. Oleophilic alcohols may be of interest for numerous purposes of use as main component of the oil phase which component is stable to hydrolysis. However, such alcohols frequently exhibit an insufficient lubricating property. In contrast thereto, carbonic acid diesters of the definition according to the invention have been known from the pertinent state of the art as efficient lubricants. Thus, for example, it may be appropriate to employ mixed oil phases which contain at least 10% by weight, and especially from about 15 to 50% by weight, of the carbonic acid diester. More particularly, under working conditions which require a reduced hydrolytic attack, for example to oil-based fluids including those of the W/O inverted type, the predominant or even exclusive use of the carbonic acid diesters may be particularly useful. Proportions of from about 50 to 95% by weight of the oil phase are characteristic for mixed oil phases of the type concerned here.

As to the chemical nature of the mixing components employed and based on oleophilic alcohols, ethers and/or carboxylic acids, there is referred to the disclosure of the older applications, with particular reference to the initally mentioned application U.S. Ser. No. 07/768,937 with respect to the oleophilic alcohols and to the older application U.S. Ser. No. 07/768,419 with respect to the oleophilic ethers.

Carboxylic acid esters suitable as mixing components have in detail been described in the older appplications U.S. Ser. No. 07/759,097; U.S. Ser. No. 07/825,431; U.S. Ser. No. 07/752,694 and U.S. Ser. No. 752,692.

It is further important that all these additives have flash points of at least 80° C. and preferably of at least 100° C., while substantially higher values, for example those in excess of 150° C., may be especially suitable. Further important for an optimum utilization of the goal of the invention is the requirement that said alcohols, ethers and/or ester oils have a constitution which renders them biologically and ecologically compatible and, more specifically are also acceptable, even in consideration of a partial hydrolysis thereof, under the aspect of inhalation toxicology. Here, to the effect there are applicable in detail the deliberations set forth above with respect to the carbonic acid diesters and the alcohol components employed therefor.

Some notes may also be required to the carboxylic acids formed upon partial hydrolysis of concomitantly used carboxylic acid ester oils. Here, two basically different types— the transition between both being continuous—may be distinguished dependently on the particular constitution of the carboxylic acid employed: Carboxylic acids resulting in salts of carboxylic acids which have emulsifier activity, or salts which are inert. This is crucially determined by the chain length of the released carboxylic acid molecule. To be further considered is the salt-forming cation which is usually provided from the alkali reserve of the drilling fluid. Here, generally the following rules are applicable:

Lower carboxylic acids, for example those having from 1 to 5 carbon atoms, lead to the formation of inert salts, for example to the formation of the respective acetates or propionates. Fatty acids having a higher chain length, and especially those of the range of $C_{12-24}$, lead to compounds with emulsifier activity. Greater details thereto are found in the quoted older applications relating to carboxylic acid ester oils as an oleophilic phase in drilling fluids of the W/O type or of the O/W type, respectively.

If oleophilic carboxylic acid ester oils are concomitantly used as a component of the mixture, then according to the invention they will preferably fall in one of the following subclasses:

a) Esters of $C_{1-5}$-monocarboxylic acids and mono- and/or polyfunctional alcohols, whereof the moieties of monohydric alcohols comprise at least 6 carbon atoms and preferably at least 8 carbon atoms and the polyhydric alcohols preferably have from 2 to 6 carbon atoms in the molecule, b) Esters of monocarboxylic acids of synthetic and/or natural origin comprising from 6 to 16 carbon atoms, and more specifically esters of aliphatic saturated monocarboxylic acids and mono- and/or polyfunctional alcohols of the kind mentioned in a), c) Esters of olefinically mono- and/or polyunsaturated monocarboxylic acids having at least 16, and especially 16 to 24 carbon atoms and especially monofunctional straight-chain and/or branched alcohols.

Starting materials for recovering numerous monocarboxylic acids falling under these subclasses, especially those having a higher number of carbon atoms, are vegetable and/or animal oils. There may be mentioned coconut oil, palm kernel oil and/or babassu oil, especially as feedstock for the recovery of monocarboxylic acids of the prevailing range up to $C_{18}$ and of essentially saturated components. Ester oils of vegetable origin based on olefinically mono- and optionally poly-unsaturated carboxylic acids of the range of $C_{16-24}$ are, for example, palm kernel oil, peanut oil, castor oil, sunflower oil, and especially rapeseed oil. Carboxylic acids of animal origin of this kind include, for example, the appropriate mixtures from tallow and/or fish oils such as herring oil.

Additives to the oil-based and/or water-based fluid

Valid are here the general laws to be observed for the compositions of the respective treatment liquids, with respect to which exemplifying indications are set forth by means of the respective drilling muds.

Inverted drilling muds conventionally contain, together with the continuous oil phase, the finely dispersed aqueous phase in amounts of from 5 to 45% by weight, and preferably in amounts of from about 5 to 25% by weight.

To the rheology of inverted drilling fluids according to the invention, there are applicable the following rheological data: Plastic viscosity (PV) within the range of from about 10 to 60 mPa.s, and preferably from about 15 to 40 mPa.s; flow limit (yield point, YP) within the range of from about 5 to 40 lb/100 ft$^2$, and preferably within the range of from about 10 to 25 lb/100 ft$^2$,—each determined at 50° C. The determination of these parameters, the methods of measurement employed therefor, and the further conventional composition of the inverted drilling fluids described here is in detail in accordance with the indications of prior art as initially quoted and have been extensively described, for example, in the reference book "Manual of Drilling Fluids Technology" by the company NL-Baroid, London, GB, cf. therein especially the chapter "Mud Testing—Tools and Techniques" and "Oil Mud Technology" which reference book is freely available to the interested artisans.

In emulsion fluids, the dispersed oil phase is conventionally present in amounts of from at least about 1 to 2% by weight, and frequently in amounts of at least about 5% by weight, and preferably of at least about from 7 to 8% by weight as an O/W emulsion. Here the oil portion preferably should not exceed about 50% by weight and particularly comprise not more than about 40% by weight—the % by weight being based on the sum of the unweighted liquid portions of oil/water.

Besides the water content, there are to be taken into consideration all of the additives provided for comparable types of fluids, the addition of which in the conventional manner is related to a specifically desired profile of properties of the drilling fluid. Said additives may be water-soluble, oil-soluble and/or water-dispersible and/or oil-dispersible.

Classical additives include: Emulsifiers, fluid-loss additives, soluble and/or insoluble materials to build-up structural viscosity, alkali reserve, agents for inhibiting an undesirable water exchange between drilled formations—e.g. water-swellable clays and/or salt layers—and the, e.g., water-based drilling fluid, wetting agents for an improved strike of the emulsified oil phase on solid surfaces, e.g. for improving the lubricating effect, but also for improving the oleophilic closure of exposed rock formations, e.g. rock surfaces, biocides, for example for inhibiting bacterial onset and growth of O/W emulsions and the like. In detail, reference is here to be made to pertinent prior art such as described, for example, in the technical literature as initially quoted; cf., more specifically, Gray and Darley, loc. cit., Chapter 11, "Drilling Fluid Components". Just by way of an excerpt, there may be quoted:

Finely dispersed additives for *increasing the density of the fluid: Widely used is barium sulfate (baryte), but also calcium carbonate (calcite) or the mixed carbonate of calcium and magnesium (dolomite) are used.

Agents for a build-up of structural viscosity which simultaneously will act as fluid-loss additives: Here, bentonite or hydrophobized bentonits are to be mentioned in the first place. For salt water fluids, other comparable clays, and more specifically attapulgite and sepiolite are of considerable importance in practice.

Also the concomitant use of organic polymer compounds of natural and/or synthetic origin may be of considerable importance in this connection. There may be especially mentioned starch or chemically modified starches, cellulose derivatives such as carboxymethyl-cellulose, guar gum. Manthan gum, or also merely synthetic water-soluble and/or water-dispersible polymer compounds, especially of the type of the high molecular weight polyacryl amide components with or without anionic or cation modifications, respectively.

Diluents for regulating the viscosity: The so-called diluents (thinners) may be organic or inorganic in nature. Examples for organic thinners are tannin and/or quebracho extract. Further examples are lignite and lignite derivatives, especially lignosulfonates. However, as has been set forth hereinabove, in a preferred embodiment, just here toxic compounds will not be used, among which in the first place the respective salts with toxic heavy metals such as chromium and/or copper are to be mentioned. Polyphosphate compounds constitute an example of inorganic thinners.

Emulsifiers: Here the type of fluid is crucial. Emulsifiers suitable in practice to form W/O emulsions, more specifically, are selected oleophilic fatty acid salts, for example those based on amidoamine compounds. Examples thereof have been described in the U.S. Pat. No. 4,374,737 already quoted and in the literature described therein.

For the preparation of O/W emulsions, different emulsifiers are required in a per se known manner. However, it has been shown that a stable dispersion to form an O/W emulsion may be much more easily attained than in the case of dispersing neat mineral oils as employed according to prior art. This means a first facilitation. Furthermore it is to be taken into account that upon a concomitant use of ester oils, due to a partial saponification with a participation of a suitable alkali reserve, by a use of longer-chain carboxylic acids effective O/W emulsifiers will be subsequently formed and, thus, will contribute to a stabilization of the system.

Additives inhibiting the undesirable water-exchange with, for example, clays: Here to be considered are the additives known from prior art for oil- and water-based drilling fluids. These include halides and/or carbonates of the alkali and/or alkaline earth metals, whereof the potassium salts, optionally in combination with lime, may be of particular importance.

Reference may be made, for example, to the relevant publications in "Petroleum Engineer International", September 1987, 32–40, and "World Oil" November 1983, 93–97.

Alkali reserves: Here to be taken into consideration are inorganic and/or organic bases adjusted to match the total behavior of the fluid, and more particularly basic salts or hydroxides of alkali and/or alkaline earth metals as well as organic bases. Kind and amount of these basic components will have been selected and mutually adjusted in a known manner so that the drilling hole treating agents will be adjusted to a pH value within the range of from about neutral to moderately basic, especially to the range of from about 7.5 to 11.

In the group of organic bases there is to be made a conceptional differentiation between water-soluble organic bases—for example compounds of the diethanolamine type—and virtually water-insoluble bases of a markedly oleophilic character like those described as an additive to ester oil-based inverted drilling muds in Applicant's initially quoted older application U.S. Ser. No. 07/825,436. It is just the concomitant use of also such oil-soluble bases within the scope of the present invention that falls under the new teaching. Then, however, oleophilic bases of this kind which are especially distinguished by a longer hydrocarbon moiety comprising, for example, from 8 to 36 carbon atoms, are no longer dissolved in the aqueous phase, but are dissolved in the oil phase. Here the basic components have a multiple function. On the one hand they may directly act as alkali reserve. On the other hand they impart some positive charge condition to the dispersed oil droplet and, hence, lead to an increased interaction with negative surface charges as are especially encountered with hydrophilic clays and clays capable of ion-exchange. Thereby, according to the invention influence may be exerted on the hydrolytic cleavage and the oleophilic closure of water-reactive rock layers.

Basically, the amounts of each of the auxiliary materials and additives is within the conventional range and, thus, may be learnt from the relevant literature as quoted.

EXAMPLES

In the following Examples 1 to 4, by observation of a standard formulation for oil-based drilling fluid systems of the W/O type there are set forth appropriate drilling fluid systems, wherein each continuous oil phase is formed by oleophilic carbonic acid diesters within the meaning of the definition according to the invention. The viscosity characteristics are determined with unaged and aged material as follows:

Measurement of the viscosity at 50° C. in a Fann-35viscosimeter from the company Baroid Drilling Fluids, Inc. In a per se known manner there have been determined the plastic viscosity (PV), the yield point (YP) and the gel strength (lb/100 ft$^2$) after 10 seconds and after 10 minutes. Further determined is the fluid loss value (HTHP).

Ageing of the respective drilling fluid is effected by way of a treatment at 125° C. in an autoclave—in a so-called roller oven—for 16 hours.

The drilling fluid systems are composed in a per se known manner in accordance with the following basic formulation:

| | |
|---|---|
| 230 ml | of carbonic acid diester oil |
| 26 ml | of water |
| 6 g | of organophilic bentonite (GELTONE from the company Baroid Drilling Fluids, Inc.) |
| 12 g | of organophilic lignite (DURATONE from the company Baroid Drilling Fluids, Inc.) |
| 2 g | of lime |
| 6 g | of W/O emulsifier (EZ-mul from the company Baroid Drilling Fluids, Inc.) |
| 6 g | of W/O emulsifier (INVERMUL NT from the company Baroid Drilling Fluids, Inc.) |
| 346 g | of baryte |
| 9.2 g | of $CaCl_2.2\ H_2O$ |

EXAMPLE 1

The oil phase is formed by a carbonic acid diester, the alcohol moieties are derived from a fatty alcohol of natural origin of the predominant range of $C_{12/14}$ (commercial product Lorol Spezial of Applicant). The respective carbonic acid diester has a viscosity (Brookfield at 25° C.) of 12 cP. The characteristic values determined of the unaged and of the aged material have been compiled in the following Table.

| | Unaged Material | Aged Material |
|---|---|---|
| Plastic viscosity (PV) | 56 | 71 |
| Yield point (YP) | 32 | 43 |
| Gel strength (lb/100 ft²) | | |
| 10 seconds | 14 | 18 |
| 10 minutes | 30 | 32 |
| HTHP 5 ml | | |

EXAMPLE 2

As the continuous oil phase there is employed a carbonic acid diester based on a 1:1 mixture (parts by weight) of isotridecyl alcohol and a $C_{12-18}$ fatty alcohol mixture (commercial product, Lorol Techn. of Applicant). The viscosity of the carbonic acid diester mixture (Brookfield, 25° C.), is 23.5 cP.

The following values of the unaged and of the aged material have been determined:

| | Unaged Material | Aged Material |
|---|---|---|
| Plastic viscosity (PV) | 74 | 84 |
| Yield point (YP) | 29 | 28 |
| Gel strength (lb/100 ft²) | | |
| 10 seconds | 11 | 11 |
| 10 minutes | 22 | 19 |
| HTHP 3 ml | | |

EXAMPLE 3

Here as the continuous oil phase there is employed a symmetric carbonic acid diester based on 2-ethylhexanol as the oil-soluble alcohol. The viscosity of said ester (Brookfield, 25° C.), is 8 cP.

The characteristic values determined of the unaged and of the aged material are as follows:

| | Unaged Material | Aged Material |
|---|---|---|
| Plastic viscosity (PV) | 34 | 30 |
| Yield point (YP) | 8 | 8 |
| Gel strength (lb/100 ft²) | | |
| 10 seconds | 4 | 4 |
| 10 minutes | 8 | 7 |
| HTHP 3 ml | | |

EXAMPLE 4

In this test as the continuous oil phase there is employed a symmetric carbonic acid diester based on isotridecanol as the oil phase. The viscosity of said ester (Brookfield, 25° C.), is 29 cP.

The following values have been determined in the indicated manner.

| | Unaged Material | Aged Material |
|---|---|---|
| Plastic viscosity (PV) | 94 | 100 |
| Yield point (YP) | 32 | 27 |
| Gel strength (lb/100 ft²) | | |
| 10 seconds | 11 | 10 |
| 10 minutes | 18 | 15 |
| HTHP 3 ml | | |

COMPARATIVE EXAMPLE A

For comparison, a carboxylic acid ester oil is employed as the continuous oil phase in the formulation as initially indicated, which oil comprises an ester mixture comprising substantially saturated fatty acids based on palm kernel and 2-ethylhexanol. It is derived to the by far predominating part from $C_{12/14}$-carboxylic acids and conforms to the following specification:

| | |
|---|---|
| $C_8$: from | 3.5 to 4.5% by weight |
| $C_{10}$: from | 3.5 to 4.5% by weight |
| $C_{12}$: from | 65 to 70% by weight |
| $C_{14}$: from | 20 to 24% by weight |
| $C_{16}$: | about 2% by weight |
| $C_{18}$: from | 0.3 to 1% by weight |

The ester mixture is a bright yellow liquid which has a flash point in excess of 165° C. and a viscosity (Brookfield, 20° C.) of from 7 to 9 cP.

The viscosity characteristics determined with the unaged and aged fluid are as follows:

| | Unaged Material | Aged Material |
|---|---|---|
| Plastic viscosity (PV) | 34 | 34 |
| Yield point (YP) | 10 | 8 |
| Gel strength (lb/100 ft²) | | |
| 10 seconds | 6 | 5 |
| 10 minutes | 10 | 10 |

|  | Unaged Material | Aged Material |
|---|---|---|
| HTHP 4 ml | | |

The comparison of the characterizing data obtained upon the use of said ester oil—the use of which is the subject matter of the older application U.S. Ser. No. 07/825,431—with the characteristic data of Example 3 of the present invention shows an approximate congruency.

If substance mixtures from the ester oils here concerned—carbonic acid diesters according to Example 3 and carbonic acid esters according to Comparative Example A—are prepared and employed in the formulation as initially set forth, and the fluids are subjected to the measurements, then comparable results of the values measured with the unaged and aged materials are obtained at virtually any mixing ratio.

EXAMPLES 5 AND 6

In the following Examples 5 and 6, water-based emulsion fluids using an oleophilic carbonic acid diester as the dispersed oil phase are prepared according to the following procedure:

First, a homogenized slurry containing 6% by weight of bentonite is produced from a commercially available bentonite (non-hydrophobized) and tap water and the pH value thereof is adjusted to from 9.2 to 9.3 with caustic soda solution.

This pre-swollen bentonite phase is charged and, in subsequent process steps—each with thorough mixing—, the individual components of the water-based carbonic acid diester-oil emulsion are incorporated in accordance with the following formulation:

| | |
|---|---|
| 350 g | of 6% by weight bentonite solution |
| 1.5 g | of commercial carboxymethylcellulose (of low viscosity) (Relatin U 300 S 9) |
| 35 g | of sodium chloride |
| 70 g | of carbonic acid diester oil |
| 1.7 g | of emulsifier (sulf. castor oil "Turkey-red oil") |
| 219 g | of baryte |

The viscosity of the O/W emulsions fluids thus prepared is determined as follows:

First at 50° C. the plastic viscosity (PV), the yield point (YP) and the gel strength after 10 seconds and 10 minutes of the unaged emulsion fluid are determined with the unaged material.

Then the emulsion fluid is aged at 125° C. for 16 hours in an autoclave—in the so-called roller oven —in order to test the influence of the temperature on the stability of the emulsion. Then the viscosity values are once more determined at 50° C.

The details are as follows:

EXAMPLE 5

As the dispersed oil phase there is employed the isotridecyl carbonic acid diester of Example 4. The following values were determined of the unaged and aged material:

|  | Unaged Material | Aged Material |
|---|---|---|
| Plastic viscosity (PV) | 9 | 14 |
| Yield point (YP) | 38 | 28 |
| Gel strength (lb/100 ft$^2$) | | |
| 10 seconds | 28 | 21 |
| 10 minutes | 35 | 47 |

EXAMPLE 6

As the dispersed oil phase there is employed the carbonic acid diester mixture of Example 2. The values determined of the unaged and aged material are as follows:

|  | Unaged Material | Aged Material |
|---|---|---|
| Plastic viscosity (PV) | 11 | 13 |
| Yield point (YP) | 39 | 28 |
| Gel strength (lb/100 ft$^2$) | | |
| 10 seconds | 25 | 20 |
| 10 minutes | 34 | 39 |

We claim:

1. A drill-hole treatment composition which is fluid and pumpable in the temperature range of from about 5° C. to about 20° C., said composition having an oil phase and an aqueous phase, said oil phase comprising an oleophilic carbonic acid diester based on an oil-soluble monofunctional alcohol or a water-soluble or oil-soluble polyfunctional alcohol, and an oleophilic carboxylic acid ester oil, oleophilic alcohol, or oleophilic ether wherein the mixture has a flash point above 80° C.

2. A drill-hole treatment composition according to claim 1 wherein said oil phase comprises the continuous phase of said composition.

3. A drill-hole treatment composition according to claim 1 wherein said aqueous phase comprises the continuous phase of said composition.

4. A drill-hole treatment composition according to claim 1 further containing an auxiliary agent selected from the group consisting of a viscosity modifier, emulsifier, fluid-loss additive, wetting agent, finely-divided weighting agent, salt, alkali reserve, and biocide.

5. A drill-hole treatment composition according to claim 1 wherein said monofunctional alcohol is straight-chain or branched, is free from aromatic molecular constituents, and contains at least 6 carbon atoms.

6. A drill-hole treatment composition according to claim 5 wherein said monofunctional alcohol contains from 8 to 40 carbon atoms.

7. A drill-hole treatment composition according to claim 1 wherein said polyfunctional alcohol contains from 2 to 5 hydroxyl groups and from 2 to 40 carbon atoms.

8. A drill-hole treatment composition according to claim 1 containing oligomeric carbonic acid diesters.

9. A drill-hole treatment composition according to claim 1 wherein said ester oil comprises an ester of a $C_1$–$C_5$ monocarboxylic acid and a monofunctional alcohol having at least 6 carbon atoms or a polyfunctional alcohol having from 2 to 6 carbon atoms.

10. A drill-hole treatment composition according to claim 1 wherein said ester oil comprises an ester of a $C_6$–$C_{16}$ monocarboxylic acid and a monofunctional alcohol having at least 6 carbon atoms or a polyfunctional alcohol having from 2 to 6 carbon atoms.

11. A drill-hole treatment composition according to claim 1 wherein said ester oil comprises an ester of a $C_{16}$–$C_{24}$ mono- or poly-unsaturated monocarboxylic acid and a monofunctional alcohol.

12. A drill-hole treatment composition according to claim 1 wherein said diester is present in the amount of at least about 5% by weight, based on the weight of said oil phase.

13. A drill-hole treatment composition according to claim 1 wherein said diester has a setting point and pour point of below 0° C.

14. A drill-hole treatment composition according to claim 1 in the form of an invert W/O emulsion wherein the continuous oil phase has a solidification point of below 0° C. and a Brookfield (RVT) viscosity at a temperature of 0° C. to 5° C. of not more than about 55 mPa.s.

15. A drill-hole treatment composition according to claim 1 in the form of an O/W emulsion wherein the oil phase has a Brookfield (RVT) viscosity at about 20° C. of up to about 2,000,000 mPa.s.

16. A drill-hole treatment composition according to claim 1 having a pH of from about 7.5 to about 11.

17. A drill-hole treatment composition according to claim 1 further containing an oleophilic amine.

* * * * *